United States Patent [19]
Adams et al.

[11] Patent Number: 5,401,518
[45] Date of Patent: Mar. 28, 1995

[54] FOOD COATING COMPOSITION AND A PROCESS OF PREPARING A FOOD COMPOSITION USING SAME

[75] Inventors: Robert M. Adams, Sherman Oaks; Nicholas Melachouris, Westlake Village; George Tonner, Simi Valley, all of Calif.; Dharam V. Vadehra, New Milford, Conn.

[73] Assignee: Nestec S.A., Vevey, Switzerland

[21] Appl. No.: 159,952

[22] Filed: Nov. 30, 1993

Related U.S. Application Data

[63] Continuation of Ser. No. 822,540, Jan. 17, 1992, abandoned, which is a continuation-in-part of Ser. No. 550,457, Jul. 10, 1990, abandoned.

[51] Int. Cl.6 .......................... A23B 9/14; A23G 9/00
[52] U.S. Cl. ........................................ 426/89; 426/98; 426/101; 426/302; 426/305; 426/310
[58] Field of Search ................ 426/302, 305, 307, 89, 426/99, 98, 101, 310

[56] References Cited

U.S. PATENT DOCUMENTS

| | | |
|---|---|---|
| 3,323,922 | 6/1967 | Durst . |
| 3,406,081 | 10/1968 | Bauer et al. . |
| 4,031,261 | 6/1977 | Durst . |
| 4,218,490 | 8/1980 | Phillips et al. . |
| 4,238,520 | 12/1980 | Miller et al. ............... 426/573 |
| 4,396,633 | 8/1983 | Tresser . |
| 4,576,826 | 3/1986 | Liu et al. . |
| 4,810,534 | 3/1989 | Seaborne et al. ............ 426/89 |
| 4,846,890 | 7/1989 | MacFarlane et al. . |
| 4,935,251 | 6/1990 | Verhoef et al. ............. 426/302 |

FOREIGN PATENT DOCUMENTS 2097646 11/1982 United Kingdom .
WO8600501 1/1986 WIPO .

*Primary Examiner*—Anthony J. Weier
*Attorney, Agent, or Firm*—Vogt & O'Donnell

[57] ABSTRACT

An emulsion which provides an edible moisture barrier coating for foods is prepared by homogenizing from about 70% to about 95% by weight of an aqueous solution of a protein isolate and from about 30% to about 5% by weight of a mixture of a saturated lipid and emulsifier, each weight being based upon the weight of the emulsion. The saturated lipid employed has a melting point higher than 30° C. The emulsifier is in an amount of from about 5% to about 30% by weight based upon the weight of the lipid and contains at least one diacetyl tartaric acid ester of a monoglyceride.

30 Claims, No Drawings

FOOD COATING COMPOSITION AND A PROCESS OF PREPARING A FOOD COMPOSITION USING SAME

CROSS REFERENCE TO RELATED APPLICATION

This is a continuation application of application Ser. No. 07/822,540, filed Jan. 17, 1992, now abandoned, which is a continuation-in-part application of application Ser. No. 07/550457, filed Jul. 10, 1990, now abandoned.

BACKGROUND OF THE INVENTION

The present invention relates to edible compositions employed to coat foods to retain moisture in the foods and/or which may be employed to inhibit migration of moisture between components of a heterogeneous food product which have differing moisture contents.

Various edible coating compositions are known and have been proposed to provide moisture barriers, including coatings which are prepared from various protein/fat combinations which may take a form of an emulsion. Illustrative of such are Verhoef, et al., U.S. Pat. No. 4,935,251 and PCT Patent Application, International Publication No. WO 86/00501.

Verhoef, et al., disclose a moisture barrier in a form of an emulsion, which contains from 40 to 60 weight percent oil or fat, 40 to 60 weight percent water, from 1 to 10 weight percent film-forming substance, which may be a material rich in protein, and up to 5 weight percent additives, which may include an emulsifier.

The PCT Application discloses a food product moisture barrier which contains a film-forming carbohydrate and/or protein polymer and a lipid layer adhered to the film-forming layer, which may be prepared in a form of an emulsion, which is spread on a surface, dried and then subsequently placed on a food product.

In addition, Durst, U.S. Pat. No. 4,031,261, discloses a stable dispersion of a film-forming substance, which may include a protein or protein isolate, and a fat, wherein the film-forming substance is first plasticized to form a saturated solution of the film-former to which a fat then is added. The dispersion, which comprises encapsulated fat, then is incorporated into a beverage composition.

SUMMARY OF THE INVENTION

The present invention provides an edible composition for coating foods comprising an emulsion of a saturated lipid which has a melting point higher than 30° C., and an emulsifier, which comprises at least one diacetyl tartaric acid ester of a monoglyceride, and an aqueous solution of a protein isolate, wherein the protein isolate solution is in an amount of from about 70% to about 95% by weight based upon the weight of the emulsion, wherein the lipid and emulsifier are in an amount of from about 5% to about 30% by weight based on the weight of the emulsion, and wherein the emulsifier is in an amount of from about 5% to about 30% by weight based on the weight of the lipid.

The present invention also provides a process for preparing the food coating composition emulsion described above, wherein the lipid, emulsifier and aqueous protein isolate solution are homogenized to form the emulsion.

The present invention further includes a process wherein a food product is coated with the above-described emulsion and food products resultant therefrom. The food products include heterogeneous food products, particularly food products wherein a component of the food product is coated with the emulsion of the present invention and combined with a second component of the food product which has a moisture content and/or water activity higher than that of the coated component.

DETAILED DESCRIPTION OF THE INVENTION

In accordance with the present invention, a protein isolate means a protein material obtained from a protein source including animal and vegetable protein sources, and as is known, protein isolates are capable of forming a film upon being set. Protein isolates which may be employed in the present invention include, for example, isolates obtained from milk and whey protein, caseinate and egg albumin. The isolates employed should have minimal, if any, denaturation. Particularly preferred embodiments of the present invention provide refrigerated and/or frozen products, and thus, the protein isolate employed is one which sets under refrigerated frozen conditions.

In addition, the protein isolates employed preferably have been purified, since it has been found that the greater the purity, the better the film-forming property will be and hence, the more effective the barrier. Illustrative of means for obtaining purified proteins is the disclosure of U.S. Pat. No. 4,218,490, and a whey protein isolate thus prepared advantageously is employed in the present invention.

The aqueous protein isolate solution may have a concentration of from about 1% to about 50% or above, but preferably has a concentration of from about 8% to about 40% by weight based upon the weight of the solution.

The saturated lipid may contain from 6 to 20 carbon atoms, but preferably contains fatty acid chains having from 10 to 20, which provides for superior barrier properties, and more preferably, from 12 to 18 carbon atoms. Additionally, it has been found that from an organoleptic point of view, it is preferable that not more than from about 15% to about 20% by weight of the lipid contains fatty acid chains having from 16 to 18 carbon atoms. Lipids containing fatty acid chains having 12 carbon atoms are particularly desirable.

Preferably, the at least one diacetyl tartaric acid ester of a monoglyceride (DATEM) is contained in an amount such as from about 8% to about 12% by weight, and the emulsifier also preferably contains an acetylated monoglyceride, and/or one or more mono- or di-glycerides having fatty acid chains having from 12 to 20 carbon atoms.

Advantageously, a polyalcohol or a polyglycol, e.g., glycerol, is incorporated in the emulsion composition to inhibit protein from becoming brittle, which thus prevents cracking or breaking of a film formed on a coated food product, particularly when the coated food product is refrigerated or frozen and/or roughly handled.

To prepare the emulsion of the present invention, the protein isolate solution, saturated lipid and emulsifier ingredients are homogenized. The homogenization may be carried out with various homogenization apparati known to those skilled in the art, which include apparati known as a "high shear" type apparati. The homogenization is carried out at temperatures of from about 30° C. to about 50° C. for from about 1 minute to about 30 minutes so the lipid will not solidify during homogenization and so the protein will not denature and set during homogenization.

The homogenization can also be performed by passing a well-stirred mixture of the ingredients through a homogenizer apparatus such as those employed for homogenization of milk and operated under like conditions (i.e., such as two stage homogenization—1st stage 2500 psi, 2nd stage 500 psi), with the caveat, again, that a temperature is maintained during homogenization so that the lipid will not solidify before homogenization is complete or result in gelation of protein, i.e., about 30° C. to about 50° C.

Preferably, the emulsion is prepared so that the particulate material of the emulsion has a particle size of from about 5 to about 30, more preferably from about 10 to about 20 and especially from about 7 to about 15 microns.

In general, any amount of the emulsion coated upon a food product will act as a barrier to retain moisture and inhibit moisture loss or transfer. However, particularly effective amounts of the emulsion coated on a food product may range from about 2% to about 15% by weight, preferably from about 5% to about 12% by weight, based, on a dry weight basis, on the weight of the food component to be coated.

The emulsion may be applied onto a food component by various techniques known to those skilled in the art, including brushing, dipping, or spraying, or by fluidized bed coating techniques, at temperatures of from about 0°C. to about 50° C.

Fluidized bed coating techniques are carried out advantageously at a temperature of from about 30° C. to about 50° C., preferably from about 35° C to about 45° C. for a time sufficient to obtain a desired amount of coating. In this technique, the food product may be treated, for example, for a period of from about 20 minutes to about 60 minutes.

Alternatively, particularly for fragile products, the coating is applied advantageously to a food product at a temperature from about 0° C. to about 10° C., preferably from about 4° C. to about 8° C. in a coating pan, as is known to those skilled in the coating art for time sufficient to obtain a desired amount of coating. In this technique, the food product may be treated, for example, for a period of from about 20 minutes to about 60 minutes, and this method also is advantageous to, if not avoid, reduce moisture migration to the food product prior to setting of the composition.

After coating, the coated food component may be cold-set. Cold setting may be effected by placing the coated product in a freezer to cool the product to a temperature of less than about $-10°$ C. and preferably to a temperature less than $-35°$ C.

The coating of this invention may be applied to a variety of products, e.g., to dough products, including pastries, pizza bases and pasta, to chocolate, to nuts, or to vegetables which are mixed with sauces in products such as frozen pizzas. In particularly favored applications, the coating is applied to particulate material such as nuts or other condiments which are incorporated in refrigerated or frozen products such as ice creams and sorbets.

Thus, the present invention is particularly useful for coating a food product which is then combined with another product with a food component having a higher moisture content and/or water activity thereby forming a heterogeneous food product. Again, although various amounts from minimal amounts to greater amounts are effective to retard or inhibit moisture migration, it is desired that the emulsion be coated on the coated food product in an amount so that migration of moisture between the food products is substantially inhibited, if not avoided.

EXAMPLES

The following Examples further illustrate the present invention. Unless otherwise indicated, parts and percentages are by weight.

EXAMPLE 1

The ingredients listed below are homogenized in an ULTRA TURRAX gear rim dispersing apparatus at 40° C. for 5 minutes:

9 parts of a 30% solution of BI-PRO whey protein isolate 0.8 parts of a DURKEE SATINA 72 saturated $C_{12}$-$C_{18}$ fat 0.1 part of GRINSTED CETODAN 50 acetylated monoglyceride 0.1 part of GRINSTED EMULSIFIER 901 emulsifier which is a mixture of diacetyltartaric acid esters of monoglycerides and mono- and diglycerides derived from saturated fat feed stocks.

The resulting emulsion contains solids having an average particle size of 10 microns.

EXAMPLE 2

The following listed ingredients are homogenized in a kitchen-type blender at 40° C for 10 minutes to obtain an emulsion:

837.6 parts of a 10% solution of BI-PRO whey protein isolate sold under the Trade Name 109.62 parts SATINA 72 fat 28.93 parts CETODAN 50 acetylated monoglyceride 13.70 parts GRINSTED EMULSIFIER 901 emulsifier 10.00 parts glycerol 1,600 parts of chopped almonds are placed in a fluidized bed at 40° C. The emulsion is placed under a pressure of 12 psi and sprayed on the almonds in the bed for a period of 40 minutes. The almonds are coated with the emulsion in an amount of 7.5% by weight based upon a dry weight of the almonds.

The coated almonds are mixed into ice cream. The coated almonds retained their texture, i.e., did not soften substantially, for 6 weeks.

COMPARATIVE EXAMPLE

Ice cream containing uncoated almonds is prepared. The almonds became soft and lost their texture within one week.

EXAMPLE 3

The emulsion of Example 2 is placed under a pressure of 30 psi and atomized and sprayed on 4,100 parts of chopped almonds in a coating pan at 6° C. over a period of 30 minutes. The almonds are coated with emulsion in an amount of 9% by weight on a dry weight of the almonds. After coating, the almonds are placed in a $-40°$ C. freezer for setting the coating.

As will be appreciated, various modifications of the foregoing invention may be made without departing from the spirit and scope of the disclosure, and the invention may be practiced suitably in the absence of elements not specifically disclosed herein.

We claim:

1. A process for preparing a food product composition comprising:

homogenizing ingredients to form an emulsion, wherein the ingredients consist essentially of a saturated lipid which has a melting point higher than 30° C., an aqueous solution of a protein isolate, and emulsifiers consisting of at least one diacetyl tartaric acid ester of monoglycerides and at least one glyceride selected from the group consisting of a monoglyceride, a diglyceride and an acetylated monoglyceride having from 12 to 20 carbon atoms, wherein the protein isolate solution is in an amount of from about 70% to about 95% by weight based on the weight of the emulsion, wherein the lipid and emulsifiers are in an amount of from about 5% to about 30% by weight based on the weight of the emulsion and wherein the emulsifiers are in an amount of from about 5% to about 30% by weight based on the weight of the lipid; and coating the emulsion onto a food product.

2. A process according to claim 1 wherein the protein isolate solution, saturated lipid and emulsifiers are homogenized at a temperature of from about 30° C. to 50° C.

3. A process according to claim 1 wherein the protein isolate solution, saturated lipid and emulsifiers are homogenized so that particles contained in the emulsion have a mean particle size of from about 5 microns to about 30 microns.

4. A process according to claim 1 wherein the food product is coated in a fluidized bed at a temperature of from about 30° C. about 50° C.

5. A process according to claim 4 wherein the temperature is from about 35° C. to about 45° C.

6. A process according to claim 1 wherein the food product is coated at a temperature of from about 0° C. to about 10° C.

7. A process according to claim 6 further comprising subjecting the coated food product to a temperature below about −10° C.

8. A process according to claim 1 wherein the saturated lipid is comprised of fatty acid chains having from 12 to 18 carbon atoms and wherein not more than about 20% by weight of the lipid is fatty acid chains having from 16 to 18 carbon atoms.

9. A process according to claim 1 wherein the protein isolate solution contains the protein isolate in a concentration of from about 8% to about 40%.

10. A process according to claim 1 wherein the protein isolate is a whey protein isolate.

11. A process according to claim 1 wherein the emulsion is coated onto the food product in an amount of from about 2% to about 15% by weight based on a dry weight of the food product.

12. A process according to claim 1 further comprising combining the coated food product with a second food product which has a water activity which is higher than a water activity of the coated food product, wherein the coating is in an amount effective to retard moisture migration from the second food product to the coated food product.

13. A product of the process of claim 1.

14. An edible food coating emulsion consisting essentially of a protein isolate, water, a saturated lipid and emulsifier wherein the lipid has a melting point higher than 30° C., wherein the emulsifier consist of at least one diacetyl tartaric acid ester of monoglycerides, and at least one glyceride selected from the group consisting of a monglyceride, a diglyceride and an acetylated monoglyceride having from 12 to 20 carbon atoms, and wherein the lipid and emulsifier are in an amount of from about 5% to about 30% by weight based on the weight of the emulsion, wherein the emulsifiers are in an amount of from about 5% to about 30% by weight based upon the weight of the lipid and wherein the protein isolate is in an amount of from about 8% to about 40% by weight based upon the combined weight of the isolate and water of the emulsion.

15. A composition according to claim 14 wherein the saturated lipid is comprised of fatty acid chains having from 12 to 18 carbon atoms and wherein not more than about 20% by weight of the lipid is fatty acid chains having from 16 to 18 carbon atoms.

16. A composition according to claim 14 wherein the protein isolate is selected from the group consisting of isolates obtained from whey protein, caseinate, egg albumin and milk protein.

17. A composition according to claim 14 wherein the protein isolate is a whey protein isolate.

18. A composition according to claim 14 wherein the emulsion contains particles having a size of from about 5 microns to about 30 microns.

19. A process according to claim 1 wherein the food product is nuts.

20. A process according to claim 12 wherein the second food product is selected from the group consisting of ice cream and sorbet.

21. A process according to claim 20 wherein the food product which is coated is nuts.

22. A process for preparing a food product composition comprising.

homogenizing ingredients to form an emulsion wherein the ingredients consist essentially of a saturated lipid which has a melting point higher than 30° C., an aqueous solution of a protein isolate, a polyalcohol, and emulsifiers consisting of at least one diacetyl tartaric acid ester of monoglycerides and at least one glyceride selected from the group consisting of a monoglyceride, a diglyceride and an acetylated monoglyceride having from 12 to 20 carbon atoms, wherein the protein isolate solution is in an amount of from about 70% to about 95% by weight based on the weight of the emulsion, wherein the lipid and emulsifiers are in an amount of from about 5% to about 30% by weight based on the weight of the emulsion and wherein the emulsifiers are in an amount of from about 5% to about 30% by weight based on the weight of the lipid; and coating the emulsion onto a food product.

23. A process according to claim 22 wherein the polyalcohol is glycerol.

24. A process according to claim 22 further comprising subjecting the coated food product to a temperature below about −10° C.

25. A process according to claim 22 further comprising incoerporating the coated food product into a second food product which is stored under a condition selected from the group of refrigeration and freezing.

26. A process according to claim 25 wherein the second food product is selected from the group consisting of ice cream and sorbet.

27. A process according to claim 26 wherein the food product which is coated is nuts.

28. An edible food coating emulsion consisting essentially of a protein isolate, water, a saturated lipid, emulsifiers and a polyalcohol, wherein the lipid has a melting point higher than 30° C., wherein the emulsifiers consist of at least one diacetyl tartaric acid ester of monoglycerides, and at least one glyceride selected from the group consisting of a monoglyceride, a diglyceride and an acetylated monoglyceride, and wherein the lipid and emulsifiers are in an amount of from about 5% to about 30% by weight based on the weight of the emulsion, wherein the emulsifiers are in an amount of from about 5% to about 30% by weight based upon the weight of the lipid and wherein the protein isolate is in an amount of from about 8% to about 40% by weight based on the combined weight of the isolate and water of the emulsion.

29. A composition according to claim 28 wherein the saturated lipid is comprised of fatty acid chains having from 12 to 18 carbon atoms and wherein not more than about 20% by weight of the lipid is fatty acid chains having from 16 to 18 carbon atoms.

30. A composition according to claim 29 wherein the polyalcohol is glycerol.

* * * * *

UNITED STATES PATENT AND TRADEMARK OFFICE
CERTIFICATE OF CORRECTION

PATENT NO.   : 5,401,518
DATED        : March 28, 1995
INVENTOR(S)  : Robert M. Adams, et. al.

It is certified that error appears in the above-indentified patent and that said Letters Patent is hereby corrected as shown below:

Column 5, lines 65 and 66 and column 6, line 3 "emulsifier" should be --emulsifiers--.

Signed and Sealed this

Thirtieth Day of May, 1995

*Attest:*

BRUCE LEHMAN

*Attesting Officer*   Commissioner of Patents and Trademarks